US012609812B2

(12) United States Patent
Sudhakaran

(10) Patent No.: US 12,609,812 B2
(45) Date of Patent: Apr. 21, 2026

(54) METHOD OF AGGREGATING DISTRIBUTED NUMERICAL DATA WITHOUT DISCLOSING THEM

(71) Applicant: THALES DIS FRANCE SAS, Meudon (FR)

(72) Inventor: Suraj Sudhakaran, Austin, TX (US)

(73) Assignee: THALES DIS FRANCE SAS, Meudon (FR)

( * ) Notice: Subject to any disclaimer, the term of this patent is extended or adjusted under 35 U.S.C. 154(b) by 504 days.

(21) Appl. No.: 17/720,330

(22) Filed: Apr. 14, 2022

(65) Prior Publication Data

US 2023/0336329 A1 Oct. 19, 2023

(51) Int. Cl.
*H04L 9/08* (2006.01)
*G06F 17/16* (2006.01)

(52) U.S. Cl.
CPC ............ *H04L 9/0825* (2013.01); *G06F 17/16* (2013.01); *H04L 9/085* (2013.01)

(58) Field of Classification Search
None
See application file for complete search history.

(56) References Cited

U.S. PATENT DOCUMENTS 8,555,400 B2 10/2013 Shi et al.
11,194,922 B2 12/2021 Parida et al.

| | | | |
|---|---|---|---|
| 11,743,257 B2 * | 8/2023 | Goldstein | H04L 9/3247 726/1 |
| 2007/0140479 A1 | 6/2007 | Wang et al. | |
| 2011/0283099 A1 | 11/2011 | Nath et al. | |
| 2012/0143922 A1 | 6/2012 | Rane et al. | |
| 2018/0205707 A1 * | 7/2018 | Bellala | H04L 9/085 |
| 2020/0026867 A1 | 1/2020 | Nicholls | |
| 2022/0343351 A1 * | 10/2022 | Heinrich | G06Q 30/0203 |
| 2022/0374542 A1 * | 11/2022 | Ghazi | G06F 21/6245 |
| 2023/0187813 A1 * | 6/2023 | Mestres | H01Q 1/2283 257/728 |
| 2023/0282359 A1 * | 9/2023 | Nakamura | G16H 20/60 705/2 |

* cited by examiner

*Primary Examiner* — Ario Etienne
*Assistant Examiner* — Mohammad Yousuf A. Mian

(57) ABSTRACT

Provided is a computer implemented method of aggregating distributed numerical data without disclosing said data By way of a user computer, an asymmetric cryptography system is provided having a public key of a user, where the numerical data of the user is stored and which user computer has access to the public key of other users, wherein a control unit as well as other user computers can connect and communicate with each other and wherein said numerical data related to each specific user is stored on the associated user computer. The method provides for each user to add a random figure to his statistical value, creates portions of this sum value intended and encrypts every portion value with the public key of one of the other users. Other embodiments are disclosed.

15 Claims, 7 Drawing Sheets

| Yes | No |
|---|---|
| 3 | 2 |

| | Alice - Y | | Bella - Y | | Carol - Y | | Diane - N | | Elaine - N | | | | |
|---|---|---|---|---|---|---|---|---|---|---|---|---|---|
| Dealer Randoms | 20 | 10 | 12 | 15 | 13 | 19 | 14 | 19 | 11 | 13 | Sum of Random | 70 | 76 |
| Yes/No Answers | 21 | 10 | 13 | 15 | 14 | 19 | 14 | 20 | 11 | 14 | | 73 | 78 |
| Part 1 | 3 | 2 | 2 | 2 | 2 | 3 | 2 | 3 | 2 | 2 | Sum of Alice Parts | 11 | 12 |
| Part 2 | 6 | 3 | 4 | 5 | 4 | 6 | 4 | 6 | 3 | 4 | Sum of Bella Parts | 21 | 24 |
| Part 3 | 5 | 3 | 3 | 4 | 4 | 5 | 4 | 5 | 3 | 4 | Sum of Carol Parts | 19 | 21 |
| Part 4 | 2 | 1 | 1 | 2 | 1 | 2 | 1 | 2 | 1 | 1 | Sum of Diane Parts | 6 | 8 |
| Part 5 | 5 | 1 | 3 | 2 | 3 | 3 | 3 | 4 | 2 | 3 | Sum of Elaine's Parts | 16 | 13 |
| Sum | 21 | 10 | 13 | 15 | 14 | 19 | 14 | 20 | 11 | 14 | Sum of all parts | 73 | 78 |

| Randoms | Value |
|---|---|
| | 15 |
| | 30 |
| | 25 |
| | 10 |
| | 20 |
| Total | 100 |

METHOD OF AGGREGATING DISTRIBUTED NUMERICAL DATA WITHOUT DISCLOSING THEM

TECHNICAL FIELD

The present invention relates to a method of aggregating distributed numerical data without disclosing them.

BACKGROUND

Today, census and other data collection initiatives rely on collecting individual information to calculate statistics used for providing targeted services to citizens and residents. In US, for e.g. the data can only be used to produce statistics. But still, the data is collected and stored and it is a potential honey pot for hackers and government has to provide efforts to keep the collected data safe and secure. In short, Data collection by governmental agencies and private entities always involve collection of individual attributes even when there is no need for the same and the agencies are looking only for statistics.

Such data can be used to provide local services as infrastructure projects from school planning to services for the elderly as well as support for the labor market.

In other words, a number of users have data which are to be protected for privacy reasons, but the users are required to transmit them to a control unit as a government agency for statistical reasons.

SUMMARY

There is the need to allow such transfer and to allow aggregation of such data for statistical reasons as providing average or sums without having access to the individual data values of the users.

The above mentioned problem is solved by the teaching of claim 1.

The computer implemented method of aggregating distributed numerical data kX provided by a group of n users without disclosing said data that, providing, by way of a user computer on which an asymmetric cryptography system is provided having a public key Kpuk of a user k, for user k for k=1 to n, where the numerical data kX of the user k is stored and which user computer has access to the public key Kpui of every other user for i=1 to n with i≠k. Such a computer can be a smart phone;

wherein a control unit, which is a computer unit to collect and store the statistical data, is configured to connect and communicate with other user computers and wherein one or more, if not all, user computers are configured to connect and communicate with other user computers that implement the method, which means that the control unit and all user computers that can interact for exchanging specific data in accordance with the cryptographic method as explained within this specification; wherein communication between the control unit and each user computer is secured by e.g. a user password or a factor-2 or -3 authentication, wherein credentials are received from the control unit to enable the direct user-to-user communication;

wherein said numerical data kX related to each user is stored on the associated user computer, the method comprises the steps of:

a data distribution step conducted by every user k for k=1 to n, having the sub steps of:

providing a random kR, adding the numerical data kX to the random kR as F1k(Xk)=kX+kR, providing a randomly provided composition of said sum F1k(Xk) in n parts with the proviso that F1k(Xk)=Σ kXi for i=1 to n, determining n−1 encrypted values for i=1 to n with i≠k as {Enc(kXm, Kpui)}, where Kpui is the i-th public key and for every encrypted value kXm the variable m is chosen in a way that it is chosen once from the set={1, 2, . . . , n} and one value $m_{fix}$ from the set is not used and stays as value $kXm_{fix}$–kR with user k, which means in other words, that each user adds a random figure to its statistical value, creates portions of this sum value intended for all other users of the group of n users and encrypts every portion value with the public key of one of the other users;

a data aggregation step conducted initially by every user k for k=1 to n, having the sub steps of:

transmitting the n−1 encrypted values {Enc(kXm, Kpui)} to user i with i=1 to n while i≠k, receiving all n−1 encrypted values {Enc(iXm,Kpuk)] which are encrypted with the public key of said user k, with i=1 to n while i≠k wherein m is defined by the determination in the encrypted value determining step, decrypting the content of the plurality of n−1 values iXm with i≠k and all values m from the set {1, 2, . . . , n} besides said one value $m_{fix}$, calculating $F2_k(X)=\Sigma kXi+(kXm_{fix}-kR)$, for all i=1 to n without i=$m_{fix}$, transmitting the calculated value $F2_k(X)$ to the control unit, which means in other words, all created encrypted portion values with the public key of one of the other users are transmitted to said users which are able to decrypt it, wherein in sequence every user is summing up all the values and transmit the end result to the control unit;

wherein the method ends with the control unit calculating the sum of all $F2_k(X)$ for k=1 to n.

The problem is solved, if instead of collecting data and computing, digital ID wallet instances are used as a distributed computing platform to compute and then collect only the required statistical data. Enabling the distributed computing, a privacy preserving way of addressing an age old problem of collecting individual data is solved without collection or storage of individual records—only public stats are accessible. Expensive protection and compliance processes are not required and the data in such a database is no data honey pot. It provides a trusted government issued identity credential with a multi party computation engine (MPC engine) and statistical collections can be extended to third parties without compromising individual privacy for public benefits which can be used for specialized hospital needs, education needs or vaccination needs. It creates a monetization opportunity for governments by engaging private entities with business needs without compromising individual privacy.

The applied formulae could be tweaked to include many use cases: list of choices, yes/no answers as detailed below.

The method can comprise a fully distributed computing of the main steps, when the n user are determining and communicating between them the n times n array of parts kXm of the distribution for k and m from 1 to n to be transmitted in an encrypted way to user i beside the main diagonal.

On the other side, it is possible that the n times n array of parts kXm of the distribution for k and m from 1 to n to be transmitted in an encrypted way to user i beside the main diagonal are determined centrally in the control unit and transmitted before the data distribution step to every user.

In such a centralized distribution every user k can transmit the encrypted values {Enc(kXm, Kpui)} to the control unit which are distributed in the data aggregation step by the control unit to every user k=1 to n so that every user i receives all n−1 encrypted values with its public key Kpui, When the sum of all $F2_k(X)$ is divided by the number of users n the average of the numerical value is created.

When the numerical data kX is 1 or 0, or the non-zero value can be any value, if the method is applied for a Yes/No question and the numerical data is 1 (or that other value) if the answer is Yes for user k, wherein the sum of all $F2_k(X)$ (divided by said non-zero value) is the number of Yes answers.

When the method is applied two times and in the second run, the numerical data is chosen 1, if the answer is No for user k, then the sum of all $F2_k(X)$ of the second run is the number of No answers. In this case, it is possible to provide any two predetermined different values as answers (the second one is not necessarily 0) since the combination allows to distinguish between yes and no.

When the method is applied p times, wherein p is the number of different possible choices for the n users and the numerical data kXj is 1 or 0 for each user k=1 to n and each choice j=1 to p, wherein the numerical data is 1 if the decision of the user is directed to the j-th choice, wherein the sum of all $F2_k^j(X)$ for k=1 to n is the number of choices j.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

FIG. 5 shows a table for an embodiment relating to two values (as Voting Yes/No or choosing between two candidates) running the embodiment once for each value;

Specific embodiments in this invention have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Briefly, "every user" is defined as a pre-defined number of participants which can be a portion of a total number of users that can be reached by a control unit. It can include every user of a particular computer (e.g. multiple users can log into the same computer), and also every user of other computers (e.g. each user logs into his or her own user computer). "Each" user refers to a specific user in pre-defined number of participants. "All users" is that group of participants consisting of "every user" whose user computer is implementing the method, in part or whole, of aggregating distributed numerical data described herein. When describing "each" and "every" user computer, this may refer to those user computers operated by users that implement the method of aggregating distributed numerical data described herein. "Every other user computer" can refer to those computers implementing the method of aggregating distributed numerical data described herein, but also computers other than those implementing the method.

Figure 1:
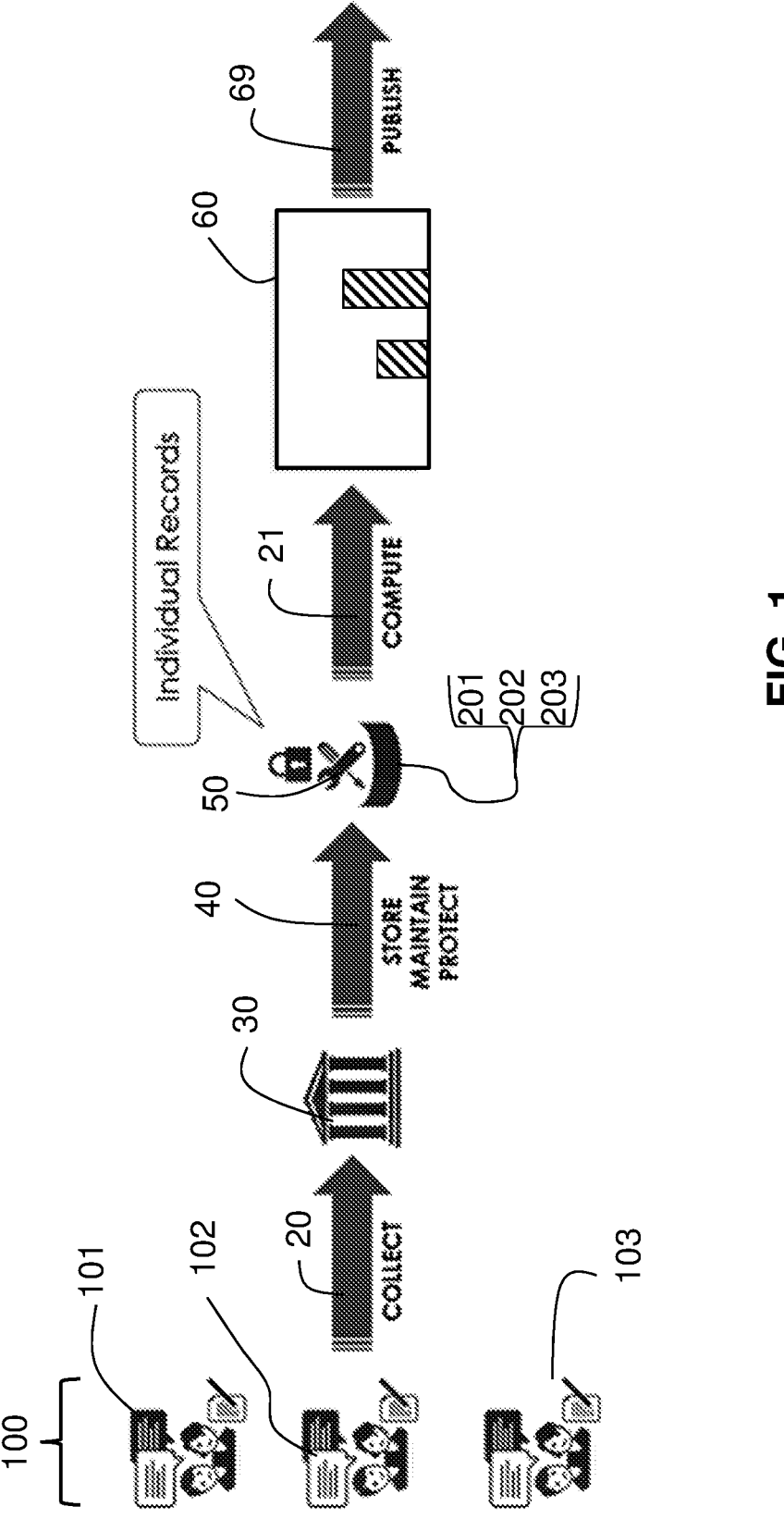
FIG. 1 shows a schematic prior art approach of gathering data especially for statistical purposes.

FIG. 1 shows a schematic prior art approach of gathering data especially for statistical purposes. The example starts with three users 101, 102 and 103, each providing one data value 201, 202 and 203 respectively. The data is collected in a collection step 20 by the collecting entity 30 and transferred in a storing step 40 into a database 50 comprising inter alia the individual records 201, 202 and 203. In preparation of statistics these data items are retrieved and computed in a computation step 21 into the statistical result 60 which is then published in a publication step 69. There are a number of different statistical results which can be derived from the basic data records 201, 202 and 203. The common point is that for the lifetime of the data, they may be protected and the storage can be secured, but they are accessible as raw data connected to the user 101, 102 and 103 who provided them.

Figure 2:
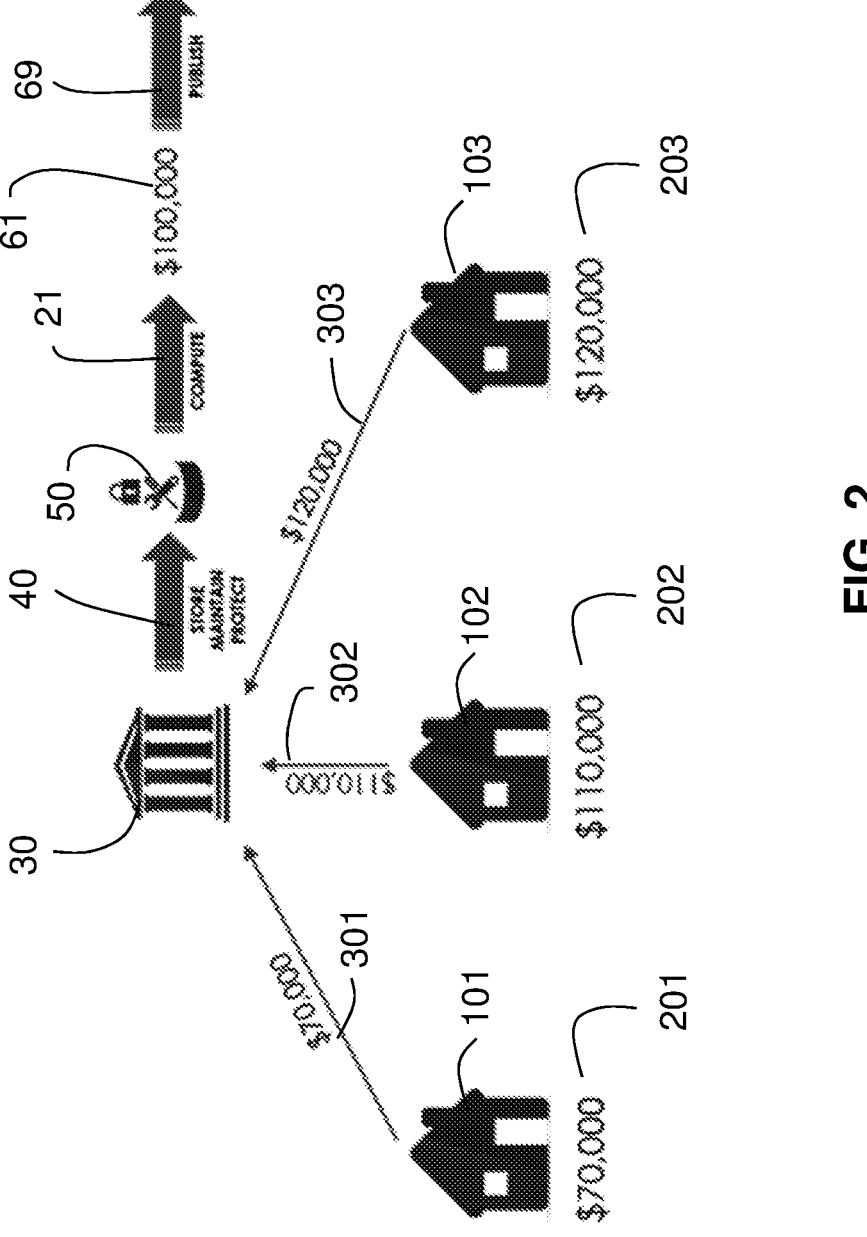
FIG. 2 shows a schematic chart of an embodiment of the invention for a single value and three users.

FIG. 2 shows a schematic chart of an example based on FIG. 1 for a single value and three users 101, 102, 103. The single value used for statistical purposes is the income of the single user or household which is noted as data value 201, 202, 203 for the three users 101, 102, 103, respectively. The data value of these data entries is 70'000, 110'000 and 120'000 USD, respectively. The data values 201, 202, 203 together with other user identifying features are transmitted in transmittal channels 301, 302 and 303 directly or indirectly via the collecting entity 30 in the storing step 40 in database 50. The computation step 21 then takes the data values and arrive at a statistical result 61 which is then published in a publication step 69.

Figure 3:
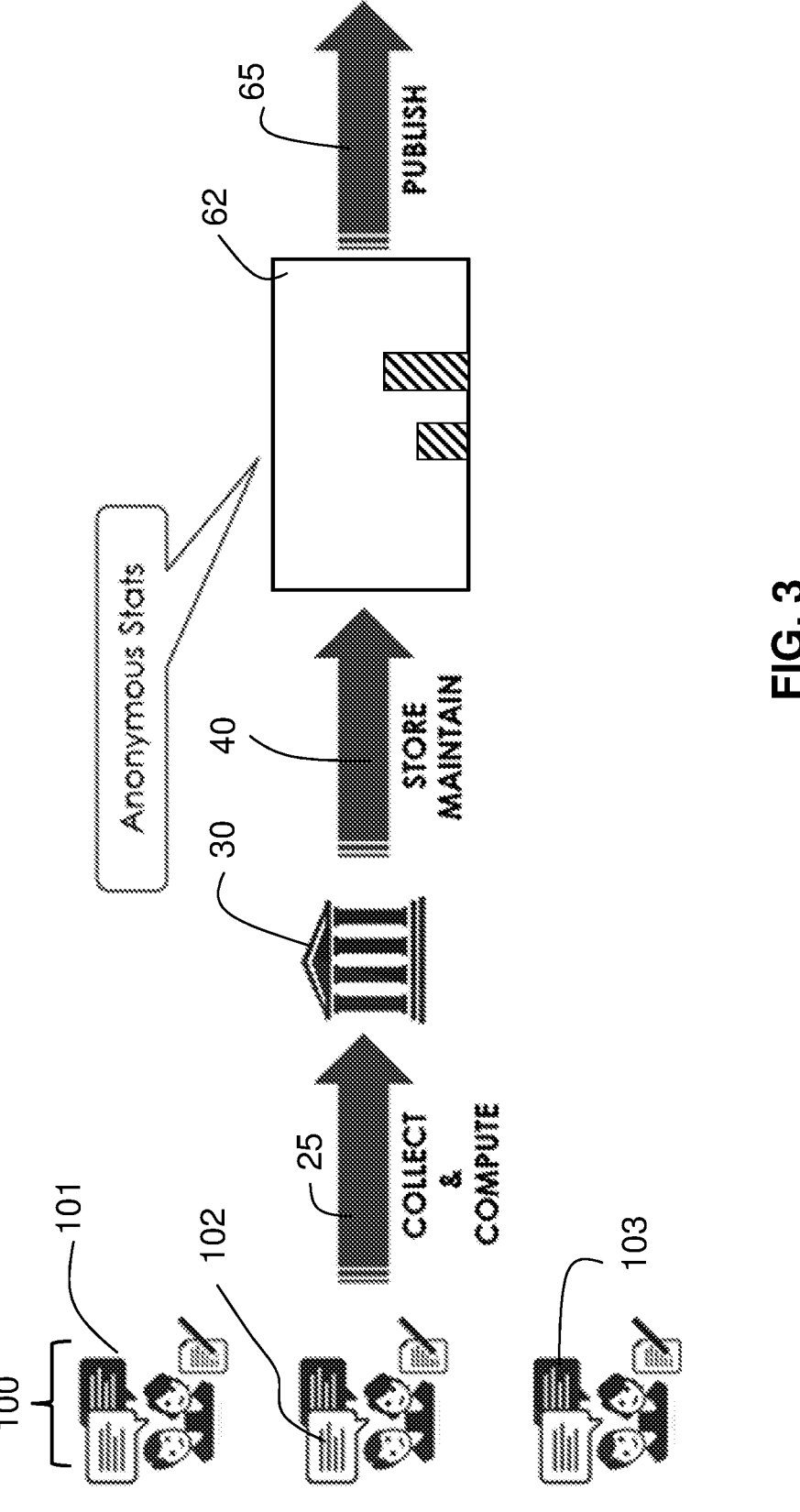
FIG. 3 shows an approach of gathering data especially for statistical purposes according to the invention.

FIG. 3 shows an approach of gathering data especially for statistical purposes according to an embodiment of the invention. The single value used for statistical purposes is the income of a user group 100 comprising three single users 101, 102 or 103 or households. The data values of these data entries values are collected and already computed in a combined collection and computation step 25 together with other user identifying features and are transmitted directly or indirectly via the collecting entity 30 in the storing step 40 in database 50. Since the computation step part has already taken place beforehand in connection with the collection step, the data values and derived statistical results 62 are stored in an anonymous way. In other words, it is a coded statistical result which is then published in a publication step 65 in the same way as in the prior art.

Figure 4:
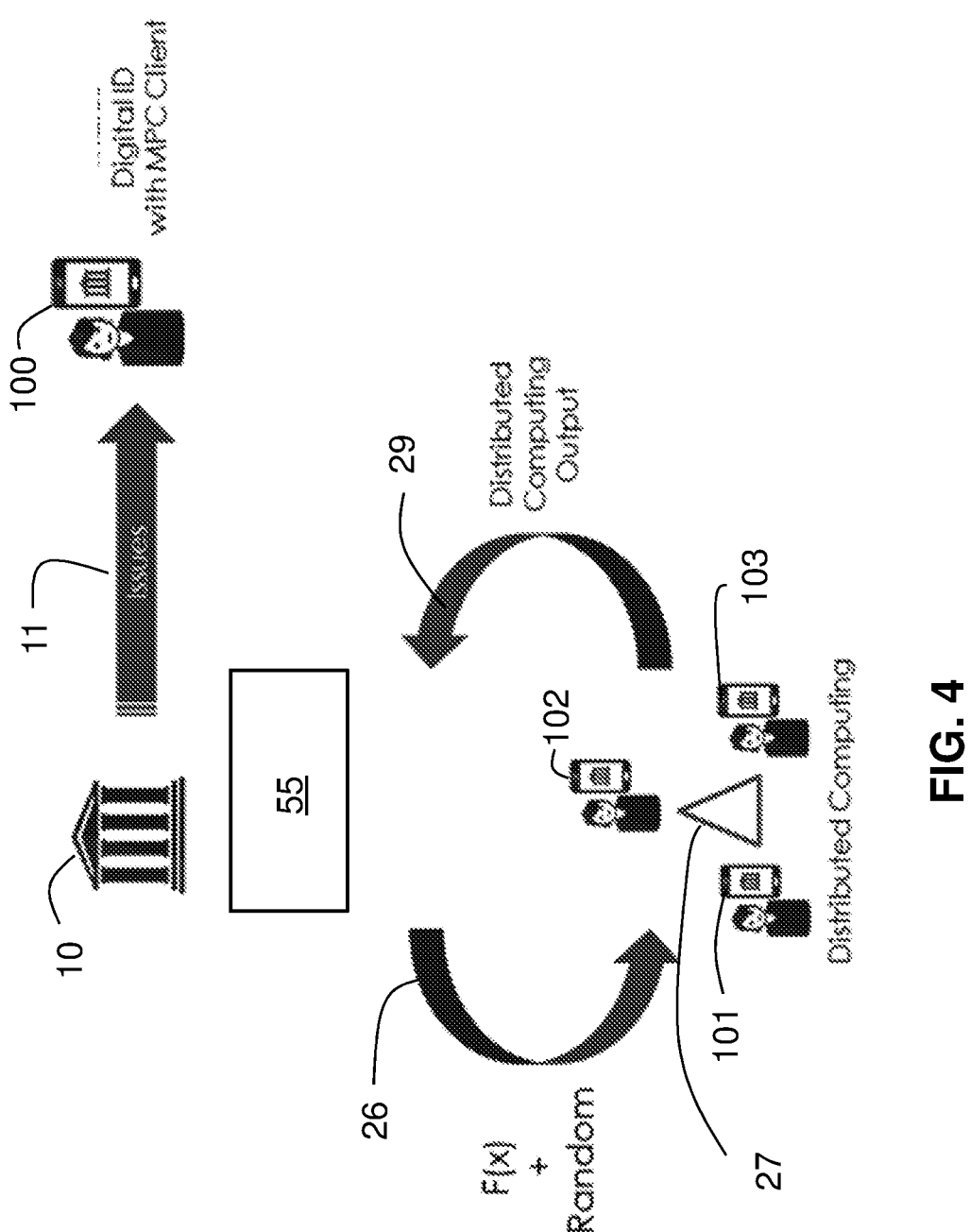
FIG. 4 shows a schematic chart of an embodiment of the invention for a single value and three users.

FIG. 4 shows a schematic chart of an embodiment of the invention for a single value and three users, i.e. three users 101, 102 and 103 communicate one value 201, 202 or 203 each, as e.g. the household income. However, this value can be the result of a Yes/No question with values 0 and 1, or the number of children in the household or the figure or a coded number for any other interesting census information.

Identical features have received identical reference numerals. Similar features have received similar reference numerals.

An embodiment of the invention starts with a control unit 10 being an digital ID platform issuing in an issuing step 11 digital ID's to every user 101, 102, 103 of a user group 100. In the framework of the digital ID for every user, such a user has a computer, e.g. a smart phone, where the private and public keys of the digital ID as generated are stored. The public keys are distributed between the users of the user group in a pre-defined data set stored on the computers of the user. This can e.g. happen during the issuing step as feeding back the public keys to the control unit 10. Each user 101, 102, 103 has installed on his personal smart phone a digital wallet app which has the function of a control app and which performs the necessary calculations and initiates and validates the communications as downloading updates, receiving instructions from the control unit 10 and sending, inter alia the public key of the user to the control unit 10. This can be part of the issuance part 11 of the control unit 10 and opens a back communication channel.

"Every user" is defined as a pre-defined number of participants which can be a portion of the total number of users which can be reached by the control unit 10. All participants are part of this Multi Party Computation (MPC).

A dealer role is attributed to a dealer module 10 or an MPC database 55. The dealer role is controlling the distributor of data as per rules. The rules are related to the distribution of the communication channels, e.g. which part "m" of the provided part composition $kXm$ of the distributed value is to be transmitted to which user "i" and which part $m_{fix}$ remains with the user. The data is encrypted by the public key of the user to whom the data should flow. This data distribution 26 for distributed computing is also part of the issuing step.

The distribution of data is shown as an example with three actors: Alice, Bella and Carol, i.e. the users 101, 102 and 103.

Alice has installed a Digital Wallet app with Alice's data and Alice's Private, Public Key Pair: Kpra, Kpua.

Bella has installed a Digital Wallet app with Bella's data and Bella's Private, Public Key Pair: Kprb, Kpub.

Carol has installed a Digital Wallet app with Carol's data and Carol's Private, Public Key Pair: Kprc, Kpuc.

These users are connected with the dealer 10 which can be part of a decentralized ID platform (DID platform) or be present in a separate network and which comprises a MPC database 55. The arrows 26 and 29 indicate that there is communication between the control unit 10 with its storage unit 55 and the Digital Wallet app on the computer device of the users. The triangle symbolizes the distributed computing communication 27 between the implicated users 101, 102 and 103.

The handling of the data values 201, 202 and 203 occurs in two distinct steps which are repeated for every implicates user 101, 102 and 103.

The MPC function $F1_a(X)$ of the user Alice 101 comprises a data value to be communicated X and a random R. The data value to be communicated X is split into the number n of participants of the specific group of users, one part for each participant. Here n=3. A random R is generated for addition to the data value to be communicated X.

For every user k=a, b, c, i.e. 101, 102, 103 the following two-step approach is performed:

Step 1: $F1_k(X) => kR+kX => kX1+kX2+kX3$, Return Value {Enc(X(k+1), Kpu(k+1)), Enc(X(k+2), Kpu(k+2))}=kY1 and kY2

Step 2: The dealer module or control unit sends the encrypted values kY1 and kY2, user k calculates $F2_k$ (kY1,kY2)=>kY1+kY2+(kX1−kR) and send this value back to the control module.

The control module receives from every user two encrypted values and send them out for receiving one value back from each user, which added up is the summed up result looked for.

Step 1 is executed for the above mentioned example of household income as follows in three subsequent steps:

$$F1_a(X) => AR+AX => AX1+AX2+AX3$$

Alice generates random AR=60,000, adds it to household income AX=70000 and splits then this value into 3 parts in random ratio, e.g.:

$$AR+AX=130000$$

$$AX1+AX2+AX3=30000+60000+40000$$

It is possible that the value of any of AX1, AX2 or AX3 are chosen to be negative.

Then the value AX2 is encrypted with Bella's public key and the value AX3 is encrypted with Carol's public key. The results {Enc(AX2, Kpub), Enc(AX3, Kpuc)}={60000, 40000} are transmitted as distributed computing output 29 to the dealer engine. It retains the value AX1−AR=−30000.

$$F1_b(X) => BR+BX => BX1+BX2+BX3$$

Bella generates random BR=90,000 and adds it to household income BX=110000 and splits it into 3 parts in random ratio, e.g.:

$$BR+BX=200000$$

$$BX1+BX2+BX3=50000+80000+70000$$

Then the value BX2 is encrypted with Alice's public key and the value BX3 is encrypted with Carol's public key. The results {Enc(BX2, Kpua), Enc(BX3, Kpuc)}={80000, 70000} are transmitted as distributed computing output 29 to the dealer engine. It retains the value BX1−BR=−40000.

$$F1_c(X) => CR+CX => CX1+CX2+CX3$$

Carol generates random CR=30,000 and adds it to household income CX=120000 and splits it into 3 parts in random ratio $$CR+CX=150000$$

$$CX1+CX2+CX3=20000+40000+90000$$

Then the value CX2 is encrypted with Alice's public key and the value CX3 is encrypted with Bella's public key. The result {Enc(CX2, Kpua), Enc(CX3, Kpub)}={40000, 90000} are transmitted as distributed computing output 29 to the dealer engine. It retains the value CX1−CR=−10000.

At the end of the completed step 1

Alice has AX1−AR=−30000

Bella has BX1−BR=−40000

Carol has CX1−CR=−10000

The dealer, i.e. the control unit has encrypted parts received from each user 101, 102, 103

$$\{Enc(AX2,Kpub),Enc(AX3,Kpuc)\}=\{60000,40000\}$$

$$\{Enc(BX2,Kpua),Enc(BX3,Kpuc)\}=\{80000,70000\}$$

$$\{Enc(CX2,Kpua),Enc(CX3,Kpub)\}=\{40000,90000\}$$

Then the sequence of steps 2 is applied for all involved users:

Step 2 with Alice

Dealer sends Enc(BX2,Kpua), Enc(CX2,Kpua) to Alice

Alice Step 2

AY1=BX2 and AY2=CX2

AY1=80000, AY2=40000, AX1−AR=−30000

$$F2_a(AY1,AY2)=AY1+AY2+(AX1-AR)=80000+40000-30000=90000$$

Alice sends $F2_a(AY1, AY2)$ to dealer

Now the dealer has $$\{Enc(AX2,Kpub),Enc(AX3,Kpuc)\}=\{60000,40000\}$$

$$\{Enc(BX2,Kpua),Enc(BX3,Kpuc)\}=\{80000,70000\}$$

$$\{Enc(CX2,Kpua),Enc(CX3,Kpub)\}=\{40000,90000\}$$

$$F2(AY1,AY2)=90000=BX2+CX2+AX1-AR$$

Step 2 with Bella

Dealer sends Enc(AX2,Kpub), Enc(CX3,Kpub) to Bella

Bella Step 2:

BY1=AX2 and BY2=CX3

BY1=60000, BY2=90000, BX1−BR=−40000

$$F2_b(BY1,BY2)=BY1+BY2+(BX1-AR)=60000+90000-40000=110000$$

Bella sends $F2_b(BY1, BY2)$ to dealer

Now the dealer has $$\{Enc(AX2,Kpub),Enc(AX3,Kpuc)\}=\{60000,40000\}$$

$$\{Enc(BX2,Kpua),Enc(BX3,Kpuc)\}=\{80000,70000\}$$

$$\{Enc(CX2,Kpua),Enc(CX3,Kpub)\}=\{40000,90000\}$$

$$F2(AY1,AY2)=90000=BX2+CX2+AX1-AR$$

$$F2(BY1,BY2)=110000=AX2+CX3+BX1-BR$$

Step 2 with Carol

Dealer sends Enc(AX3,Kpuc), Enc(BX3,Kpuc) to Carol

Carol Step 2:

CY1=AX3 and CY2=BX3

CY1=40000, CY2=70000, CX1−CR=−10000

$$F2_c(CY1,CY2)=CY1+CY2+(CX1-AR)=40000+70000-10000=100000$$

Carol sends $F2_c(CY1, CY2)$ to the dealer

Now the dealer has $$\{Enc(AX2,Kpub),Enc(AX3,Kpuc)\}=\{60000,40000\}$$

$$\{Enc(BX2,Kpua),Enc(BX3,Kpuc)\}=\{80000,70000\}$$

$$\{Enc(CX2,Kpua),Enc(CX3,Kpub)\}=\{40000,90000\}$$

$$F2_a(AY1,AY2)=90000=BX2+CX2+AX1-AR$$

$$F2_b(BY1,BY2)=110000=AX2+CX3+BX1-BR$$

$$F2_c(CY1,CY2)=100000=AX3+BX3+CX1-CR$$

Now the control unit 10 makes the MPC final computation

Dealer has $$F2_a(AY1,AY2)=90000=BX2+CX2+AX1-AR$$

$$F2_b(BY1,BY2)=110000=AX2+CX3+BX1-BR$$

$$F2_c(CY1,CY2)=100000=AX3+BX3+CX1-CR$$

Add the three F2-functions and this achieves $$F2_a(AY1,AY2)+F2_b(BY1,BY2)+F2_c(CY1,CY2)=AX1+AX2+AX3-AR+BX1+BX2+BX3-BR+CX1+CX2+CX3-CR=AX+AR-AR+BX+BR-BR+CX+CR-CR=AX+BX+CX=\text{sum of the three values}$$

Divided by number of participants gives the average $$300000/3=100000 \text{ USD}$$

Dealer sends this to Digital ID Platform 10 as the final result.

FIG. 5 shows a table for an embodiment relating to two values (as Voting Yes/No or choosing between two candidates) running the embodiment once for each value. In this case, besides the average of a specific figure, the formula is adapted for voting Yes/No, since voting Yes/No is providing the sum without calculating the average and the above mentioned numerical value is either 0 or 1 and the above steps are to be performed for every candidate/list wherein a further check can be implemented to ensure that the voting value over all candidates/lists is smaller or equal to the number of possible votes cast. In the case of a Yes/No-Question for five persons, the dealer's random value is chosen in the same way as mentioned above (here 20, 12, 13, 14, 11 and, if the answer is yes, then the value is added before the value is separated into the five parts, here for Alice, Bella and Carol in FIG. 5. The random distribution is the same for all five users, i.e. 15, 30, 25, 10 and 20 for the five parts. This is not a mandatory feature. The random distribution can be chosen different for every user. In the present case, the sum of all random values is 70, the sum of all answers is 73, so it is clear that three users have voted Yes and two have not voted or voted No. In order to be sure that these two persons have voted, another dealer's random value is chosen, here 10, 15, 19, 19 and 13. Here, the value 1 is only added, if the user voted No. i.e. to the values 19 and 13 for users Diane and Elaine. Although the dealer random distribution is different between the Yes and the No distribution, it can also be the same. The same is true for the random distribution for the five parts which can be the same of different. Of course, then it is necessary to calculate both values to achieve the secure 3:2 result on the question. In other words, the features of claim 1 are repeated twice to obtain the two result values 3 and 2.

The value of the dealer's random is preferably larger than two times the number of users n. There is no upper limit for the dealer's random beside a value which risks to be rounded.

In case of voting with a number of x different lists with x>2, the proposal of FIG. 5 is applied x times for each user and the value 1 is only added to the dealer random value for the chosen list or to no dealer random value, if no vote is cast.

The server can create a list of candidates and add random votes to each and share that with the users. Then enable MPC to add the user votes to each candidate sharing values between themselves before sending the final count back to the server. The server can then remove the random added to each candidate to see the final result.

In the general case of n users (in the above example n=3) Step 1 for every user comprises for k=1 to n, providing a random kR by user k and providing the numerical data kX, wherein the value Xk to be transmitted by user k is split into separate randomly chosen values kXi for i=1 to n, where $Xk=kX+kR=\Sigma$ kXi.

$F1_k(X_k)$ is calculated with $X_k=kR+kX$. The n−1 encrypted values for i=1 to n with i≠k {Enc(kXm, Kpui)} are transmitted to the control unit 10, where Kpui is the i-th public key and for every encrypted value kXm the variable m is chosen in a way that it is chosen once from the set= $\{1, 2, \ldots, n\}$ and one value $m_{fix}$ from the set is not used and stays as value $kXm_{fix}$−kR with user k.

Step 1 is followed by Step 2:

Dealer sends to every user k=1 to n all n−1 values encrypted with the public key of said user k, i.e. for i=1 to n with i≠k {Enc(iXm,Kpuk)} wherein m is defined by the determination in Step 1. This enables user k to decrypt the content the plurality of n−1 values iXm with i≠k and all values m from the set $\{1, 2, \ldots, n\}$ besides one value.

User k then calculates $F2_k(X)=\Sigma$ kXi+$(kXm_{fix}$−kR), for all i=1 to n without i=$m_{fix}$. All kXi can be decrypted and $(kXm_{fix}$−kR) is known by user k. $F2_k(X)$ is transmitted to the database 10.

When all users have been handled in this way, the control unit can add all $F2_k(X)$ to the final result.

Figure 6:
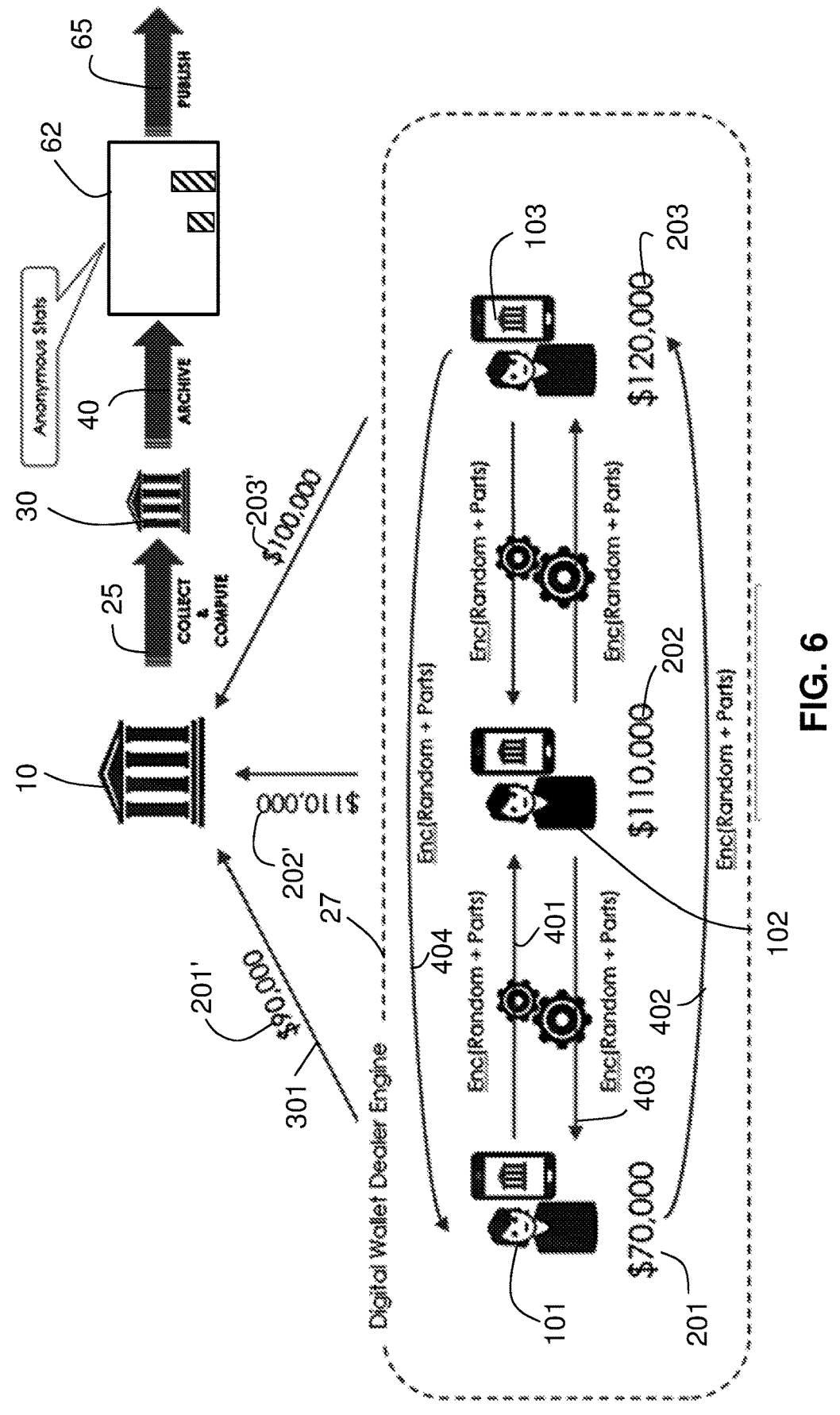
FIG. 6 shows an alternative schematic chart similar to the prior art chart of FIG. 2 but embodying the invention as shown in FIG. 4 for a single value and three users.

FIG. 6 shows an alternative schematic chart similar to the prior art chart of FIG. 2 but embodying the invention as shown in FIG. 4 for a single value and three users. In other words, it shows the gathering of the figures by the collecting unit, here the dealer module 10 so the difference due to the communication and exchange of data between the users based on the wallet dealer engine is clearly established. The "real" data values 201, 202 and 203 (the same as in the example of FIG. 2 or FIG. 4) are shown below the users. The single value used for statistical purposes is the income of the single user or household which is noted as data value 201, 202, 203 for the three users 101, 102, 103, respectively. The data value of these data entries is 70'000, 110'000 and 120'000 USD, respectively.

Within the distributed computing environment 27, each user 101, 102, 103 is exchanging and gathering the public keys of the other users. Each user is transmitting n−1 encrypted values of the random portion kXm with the public key Kpui of user I, while m is chosen from the entire set of users $\{1, \ldots, n\}$ to use all elements of said set beside one=$m_{fix}$. And user k retains $kXm_{fix}$−kR, i.e. the $m_{fix}$-th portion of the distribution minus the random value chosen by user k. For user 101, there is one transmittal 401 to user 102 and one transmittal 402 to user 103. Both are encrypted with the public key of this user so that this user can decrypt and obtain a partial value. On the other side, user 101 receives a transmittal 403 from user 102 and a transmittal 404 from user 103 and can also obtain the decrypted values of the transmittal of these users.

The sum of these decrypted value plus the remaining value $kXm_{fix}$−kR with user k are added and transmitted as transmitted value 201' of Alice, as transmitted value 202' of Bella, and as transmitted value 203' of Carol. It can be seen that these values are usually not identical to the real data values 201, 202, 203 of these users. So even, when as usual these user identifying features are transmitted in transmittal channels 301, 302 and 303 directly or indirectly via the collecting entity 30 in the storing step 40 in database 50. The computation step 21 then takes the transmitted values and arrive at the same statistical result 61 which is then published in a publication step 69 as before in the prior art approach of FIG. 2.

It is clear that computer or control module are related to computer systems with a processor, a memory, an entry unit as a keyboard and at least a display. Additional communication possibilities as WiFi, Bluetooth, 4G etc. are provided with the computer systems for a direct or indirect communication. This communication can comprise an internal exchange between the smartphones/computers of the users based on distributed computing 27 within an app as provided by the control module or indirect communication via a central computer control module 10 or 55 which provides the rules for the exchange of information. These rules can also be directly be implemented in software in the distributed computation 27 within the user domain.

Figure 7:
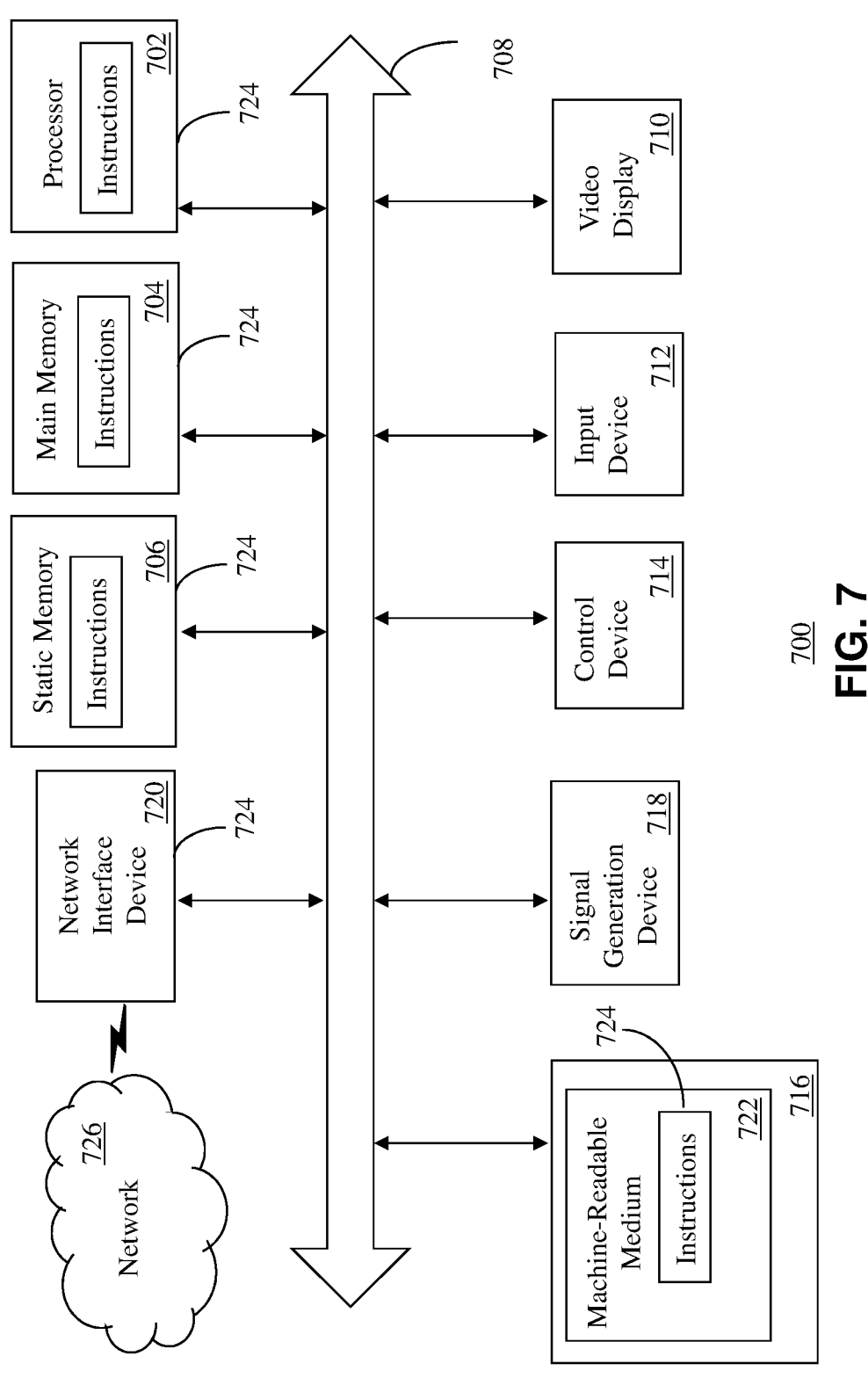
FIG. 7 depicts an exemplary diagrammatic representation of a machine and hardware platform suitable for use to perform the methods in accordance with an embodiment.

FIG. 7 depicts an exemplary diagrammatic representation of a machine 700 and hardware platform suitable for use to perform the methods and steps exemplified in FIGS. 3-6, or by components of the system shown in FIG. 6, in accordance with various embodiments, for example, the computer implemented method of aggregating distributed numerical data of claims 1-8.

The machine 700 is shown in the form of a computer system 700, within which a set of instructions, when executed, may cause the machine to perform any one or more of the methodologies discussed above. In some embodiments, the machine operates as a standalone device, such as a computer, laptop, mobile device, remote control, or display.

In some embodiments, the machine may be connected over the network to other machines. In a networked deployment, the machine may operate in the capacity of a server or a client user machine in server-client user network environment, or as a peer machine in a peer-to-peer, or distributed, network environment.

The machine may comprise a server computer, a client user computer, a personal computer (PC), a tablet PC, a laptop computer, a desktop computer, a mobile device, a smart phone, a cell phone, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

[The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display or LCD), a flat panel, a solid state display, or a cathode ray tube (CRT)). The computer system 700 may include an input device 712 (e.g., a keyboard, touchless sensing unit 110), a cursor control device 714 (e.g., a mouse, touchless sensing unit 110), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Scheme, Go, C++, C#, VB.NET, Python or the like, conventional procedural programming languages, such as the "C" programming language, Perl, PHP, dynamic programming languages such as Python, Ruby and Groovy, or other programming languages. The program code may execute entirely on the user's computer, partly on the user's computer, as a stand-alone software package, partly on the user's computer and partly on a remote computer, entirely on the remote computer or server, or within the Cloud or other computer network. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS), Platform as a Service (PaaS) for connecting mobile apps to cloud based services, and Security as a Service (SECaas).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

LIST OF REFERENCE SIGNS

| 10 | control unit/dealer module | 25 | collect and computation step |
|---|---|---|---|
| 11 | issuing step | 26 | input for distributed |
| 20 | collection step | | computing |
| 21 | computation step | 27 | distributed computing |
| 29 | distributed output | | to Bella |
| 30 | collecting entity | 402 | distributed part value of Alice |
| 40 | storing step | | to Carol |
| 50 | database | 403 | distributed part value of Bella |
| 55 | MPC database | | to Alice |
| 60 | statistical results | 404 | distributed part value of Carol |
| 61 | statistical result | | to Alice |
| 62 | coded statistical result | | |
| 65 | statistical result based on MPC | kR | random data value of user k |
| 69 | publication step | kX | data value to be |
| 100 | user group | | communicated of user k |
| 101 | user Alice | F1(Xk) | sum of random value and |
| 102 | user Bella | | data value of user k |
| 103 | user Carol | kXi | random portion of kX + kR for |
| 201 | statistical value of Alice | | user k to be transmitted to |
| 201' | transmitted value of Alice | | user i |
| 202 | statistical value of Bella | Kpuk | public Key of user k |
| 202' | transmitted value of Bella | m | takes all values from 1 to |
| 203 | statistical value of Carol | | user number n beside $m_{fix}$ |
| 203' | transmitted value of Carol | {Enc(kXm, Kpui)} | encrypted value by |
| 301 | transmittal channel of Alice | | user k of kXm for user i |
| 302 | transmittal channel of Bella | $kXm_{fix} - kR$ | remaining value with user k |
| 303 | transmittal channel of Carol | | |
| 401 | distributed part value of Alice | | |

What is claimed is:

1. A system for aggregating distributed numerical data provided by a plurality of computers without disclosing the numerical data, the system comprising:

the plurality of distributed computers, wherein each computer is associated with a user, wherein each computer is configured to connect and communicate with every other user computer, wherein each of the plurality of distributed computers stores a numerical data for the associated user, and a control unit comprising one or more processors and memory operatively coupled to the one or more processors, wherein the memory includes computer instructions which when executed by the one or more processors causes the one or more processors to connect and communicate with each computer, wherein the control unit instructs each of the plurality of distributed computers to provide the numerical data to a database, wherein the control unit retrieves the numerical data from the database and computes a statistical result, and wherein the numerical data and the statistical result are stored in the database anonymously;

wherein computing the statistical result comprises performing a data distribution and a data aggregation by every user k for k=1 to n; and wherein the data distribution comprises:

providing a random value, adding the numerical data of a user data for an associated user to the random value for the associated user as F1k(Xk)=kX+kR, wherein kX represents the numerical data for the associated user, and kR represents the random value for the associated user, providing a randomly provided composition of F1k(Xk) in n parts, such that F1k(Xk)=Σ kXi for i=1 to n, determining n−1 encrypted values for i=1 to n, wherein i≠k, with an encryption function {Enc(kXm, Kpui)}, wherein Kpui represents a public key associated with each value i=1 to n, wherein kXm is a portion of the composition of the numerical data, wherein each portion of the composition of numerical data is associated with a variable m that is chosen once from a set= {1, 2, . . . , n} so that each variable m represents a different portion of the composition of numerical data, wherein one variable m from the set is not used and is designated as 'mfix', and retaining, by the user, a value equal to a portion of the data distribution associated with mfix minus the random value.

2. The system of claim 1, wherein the control unit is configured to issue a digital ID to each of the plurality of distributed computers, wherein the digital ID includes the public key and a private key, wherein the private key is stored on the computer associated with the digital ID, wherein each data is encrypted by the public key of the user to whom the data should flow.

3. The system of claim 1, wherein the data aggregation comprises:

transmitting the n−1 encrypted values to a second user i with i=1 to n, wherein i≠k, receiving all n−1 encrypted values which are encrypted with the public key of said user k, decrypting a content of the plurality of n−1 values iXm with i≠k and all values from the set $\{1, 2, \ldots, n\}$ besides said one value mfix, calculating $F2k(X)=\Sigma\ kXi+(kXmfix-kR)$, for all i=1 to n without i=mfix, transmitting the calculated value F2k(X) to the control unit.

4. The system of claim 3, further comprising calculating, by the control unit, the sum of all F2k(X) for k=1 to n.

5. The system of claim 4, wherein a n user are determining and communicating between them an array of parts kXm of the distribution for k and m from 1 to n to be transmitted in an encrypted way to user i.

6. The system of claim 4, wherein a array of parts kXm of the distribution for k and m from 1 to n to be transmitted in an encrypted way to user i is determined centrally in the control unit and transmitted before the data distribution step to every user.

7. The system of claim 6, wherein every user k transmits the n−1 encrypted values to the control unit which are distributed in the data aggregation step by the control unit to every user k=1 to n so that every user i receives all n−1 encrypted values with its public key Kpui.

8. The system of claim 4, wherein the sum of all F2k(X) is divided by the number of users n to create an average of a numerical value of all F2k(X).

9. The system of claim 4, wherein the numerical data kX is 1 or 0, if a method is applied for a Yes/No question and the numerical data is 1 if an answer is Yes for user k, wherein a sum of all F2k(X) is a number of Yes answers.

10. The system of claim 9, wherein the data distribution and data aggregation are applied two times and in the second run, the numerical data is chosen 1, if the answer is No for user k, wherein the sum of all F2k(X) of the second run is the number of No answers.

11. The system of claim 4, wherein the data distribution and data aggregation are applied a p times, wherein p is a number of different possible choices for then users with a numerical data that is 1 or 0 for each user k=1 to n and each choice j=1 top, wherein the numerical data is 1 if a decision of the user is directed to an j-th choice, wherein the sum of all the numerical data for k=1 to n is the number of choices j.

12. A method for aggregating distributed numerical data provided by a plurality of computers without disclosing the numerical data, the system comprising:

communicating, by a control unit, with the plurality of distributed computers, wherein each computer is associated with a user, wherein each computer is configured to connect and communicate with every other user computer, wherein each of the plurality of distributed computers stores a numerical data for the associated user, and instructing each of the plurality of distributed computers to provide the numerical data to a database, retrieving, by the control unit, the numerical data from the database, and computing a statistical result, and wherein the numerical data and the statistical result are stored in the database anonymously;

wherein computing the statistical result comprises performing a data distribution and a data aggregation by every user k for k=1 to n; and wherein the data distribution comprises:

providing a random value, adding the numerical data of the a user data to the random value as $F1k(Xk)=kX+kR$, wherein kX represents the numerical data for the associated user, and kR represents the random value for the associated user, providing a randomly provided composition of the sum $F1k(Xk)$ in n parts, such that $F1k(Xk)=\Sigma\ kXi$ for i=1 to n, determining n−1 encrypted values for i=1 to n, wherein i≠k with an encryption function Enc(kXm, Kpui), wherein Kpui is a public key associated with each value i=1 to n, wherein kXm is a portion of the composition of the numerical data, wherein each portion of the composition of numerical data is associated with a variable m that is chosen once from a set=$\{1, 2 \ldots n\}$ so that each variable m represents a different portion of the composition of numerical data, wherein one variable m from the set is not used and is designated as 'mfix', and retaining, by the user, a value equal to a portion of the data distribution associated with mfix minus the random value.

13. The method of claim 12, wherein the control unit is configured to issue a digital ID to each of the plurality of distributed computers, wherein the digital ID includes the public key and a private key, wherein the private key is stored on the computer associated with the digital ID, wherein each data is encrypted by the public key of the user to whom the data should flow.

14. The method of claim 12, wherein the data aggregation comprises:

transmitting the n−1 encrypted values to second user i with i=1 to n, wherein i≠k, receiving all n−1 encrypted values which are encrypted with the public key of said user k, decrypting a content of the plurality of n−1 values iXm with i≠k and all values from the set $\{1, 2, \ldots, n\}$ besides said one value mfix, calculating $F2k(X)=\Sigma\ kXi+(kXmfix-kR)$, for all i=1 to n without i=mfix, transmitting the calculated value F2k(X) to the control unit.

15. The method of claim 14, further comprising calculating, by the control unit, a sum of all F2k(X) for k=1 to n.

* * * * *